United States Patent [19]
Sutton et al.

[11] 4,316,174
[45] Feb. 16, 1982

[54] THRESHOLD DETECTOR FOR A CONDITION INDICATION

[75] Inventors: Stephen J. Sutton, Fenton; John E. Creager, Linden; Robert B. Gelenius, Davison, all of Mich.

[73] Assignee: General Motors Corporation, Detroit, Mich.

[21] Appl. No.: 106,932

[22] Filed: Dec. 26, 1979

[51] Int. Cl.³ .............................................. G08B 21/00
[52] U.S. Cl. .................................. 340/52 R; 340/59; 340/620
[58] Field of Search ................. 340/52 R, 52 D, 52 F, 340/59, 79, 530, 603, 612, 618, 620

[56] References Cited
U.S. PATENT DOCUMENTS

| | | | |
|---|---|---|---|
| 3,694,804 | 9/1972 | Hill | 340/59 |
| 3,939,470 | 2/1976 | Arai et al. | 340/59 |
| 4,001,676 | 1/1977 | Hile et al. | 340/59 |
| 4,107,658 | 8/1978 | Hill et al. | 340/59 |

Primary Examiner—Alvin H. Waring
Attorney, Agent, or Firm—Warren D. Hill

[57] ABSTRACT

A capacitive probe for sensing the presence of water in a fuel tank increases in capacitance when water is present. A threshold detector circuit includes the capacitive probe and a reference capacitor and an oscillator for periodically charging them to the same voltage and a comparator for comparing the capacitor voltages during discharge to determine when the probe capacitance exceeds the reference capacitance. The comparator controls a lamp driver which is connected to ground and which is also connected by a single conductor to a remote indicating lamp in series with a power supply. The single conductor carries the lamp energizing current as controlled by the lamp driver and also supplies the operating voltage to the detection circuit. The resistance of the incandescent lamp varies with applied voltage so that the voltage presented to the detector circuit is partially regulated by the lamp resistance so that large changes in the power supply voltage are only partially reflected in the threshold circuit operating voltage.

2 Claims, 5 Drawing Figures

THRESHOLD DETECTOR FOR A CONDITION INDICATION

This invention relates to a threshold detector for providing an indication when a predetermined condition occurs. The invention more particularly relates to such a threshold detector having a remotely located indicator lamp.

It is often desired, for example, in an automotive vehicle to monitor operating conditions and to provide an indication or warning to an operator when a condition is out of line. Commonly, such conditions must be monitored at a location remote from the desired display for the indicator or warning device. Where the monitor or condition detector comprises a circuit, it is necessary to supply power to that circuit and also to supply a signal to the indicator for actuation thereof. Since the distance between the indicator and the detector may be great, it is desirable to minimize the number of connecting conductors.

It is, therefore, an object of this invention to provide a threshold detector having a remote lamp and power supply coupled with a detection circuit by a single conductor in addition to a ground return path. It is a further object to provide in such a threshold detector relatively well regulated operating voltage from a widely variable power supply.

The invention is carried out in an automotive vehicle by an electrical power supply and an incandescent indicating lamp series connected by a single conductor to a remotely located electronic detection circuit grounded to the power supply via the vehicle such that power to the detection circuit is carried by the single conductor and variations in power supply voltage are largely taken up by resistance changes in the serially connected incandescent indicating lamp and the detection circuit energizes the lamp through the single conductor.

The above and other advantages will be made more apparent from the following specification taken in conjunction with the accompanying drawings wherein like reference numerals refer to like parts and wherein.

Figure 1:
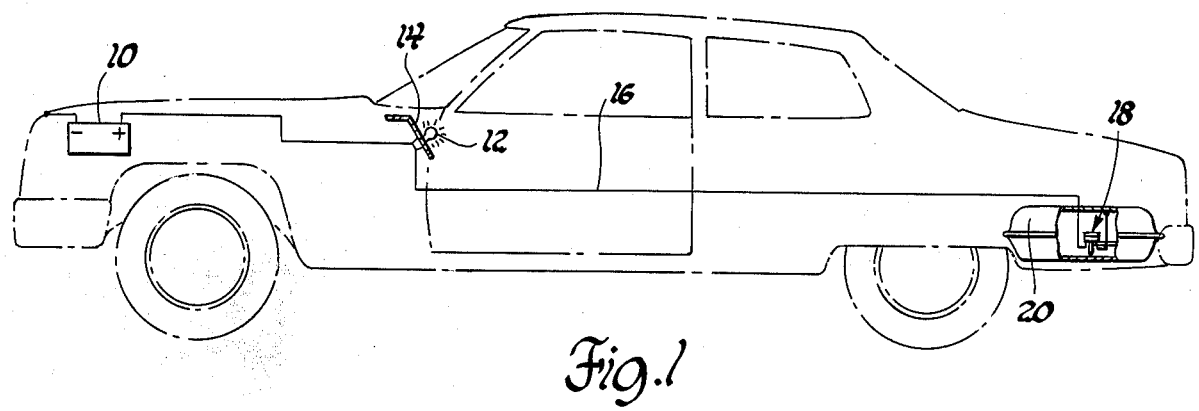
FIG. 1 is an outlined view of an automotive vehicle having a threshold detector according to the invention installed for detecting a condition in the fuel tank.

To illustrate the threshold detector of the invention, the embodiment described herein is a threshold detector for sensing the level of water in an automotive diesel fuel tank and for providing an indication when a predetermined water level occurs. FIG. 1 shows the threshold detector system in a vehicle that includes a power supply 10 in the form of a battery having one terminal grounded to the vehicle body. In practice, of course, the power supply includes a generator coupled to the battery. The other terminal of the power supply is connected to a terminal of an indicator lamp 12 mounted on the instrument panel 14 of the vehicle such that the lamp is in series with the power supply. The other terminal of the lamp 12 is connected by a single conductor 16 to the electronic detection circuit and probe assembly 18 mounted within the fuel tank 20. The assembly 18 is grounded to the fuel tank which, in turn, is electrically grounded to the vehicle body so that the body serves as a ground return to the power supply 10.

Figure 2:
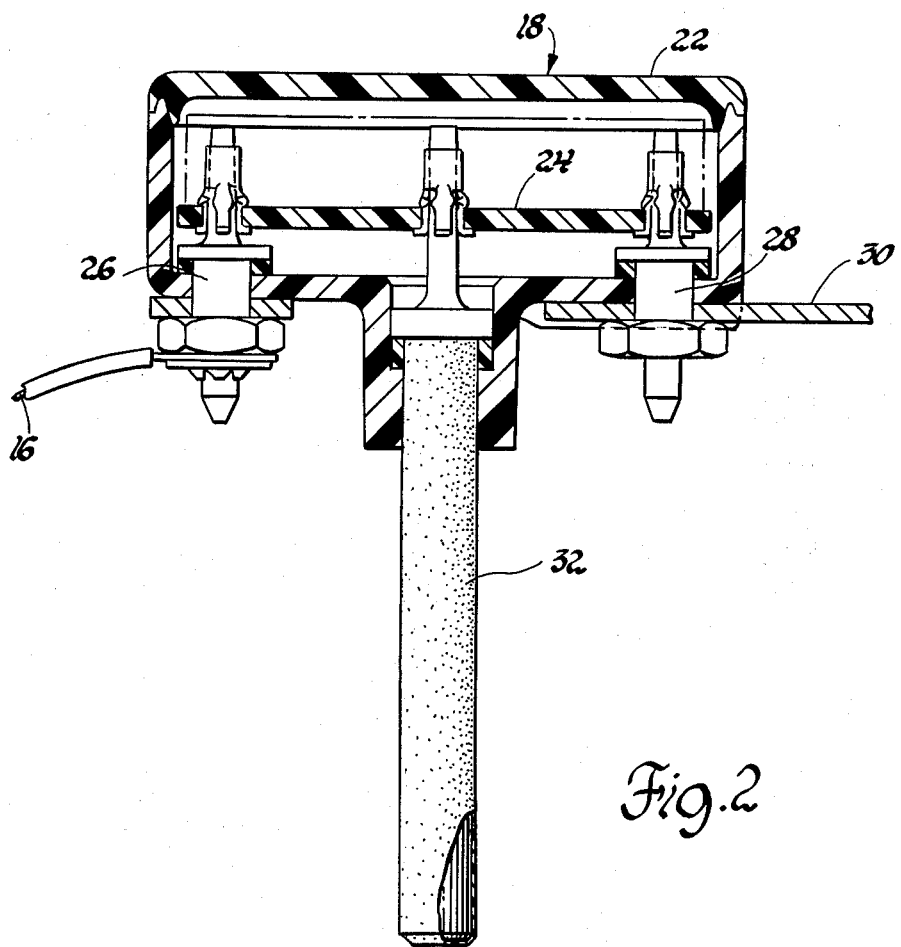
FIG. 2 is a cross-sectional view of a condition sensing probe and detection circuit assembly for mounting in a fuel tank of FIG. 1.

FIG. 2 shows a detection circuit and probe assembly 18 which comprises a sealed plastic housing 22 containing a printed circuit board 24, a first connector 26 connected to the circuit board and passing through the casing 22 for connection with the conductor 16, a second connector 28 connected to the circuit board and passing through the casing 22 for electrical connection and mechanical mounting to a bracket 30 which is welded to a fuel tube, not shown, within the fuel tank to provide mechanical support for the detection circuit and probe assembly 18 as well as electrical grounding of the connector 28 to the fuel tank 20. A cylindrical probe 32 extends through the housing and is connected to the circuit board 24. The probe 32 is a metallic rod extending about two inches beyond the casing and having a one fourth inch diameter. The rod is coated with polyethylene about 0.006 inch thick. Preferably the probe is positioned within the fuel tank with the axis of the probe substantially vertical and spaced about one half inch from the bottom of the fuel tank. When the tank is filled with diesel fuel and/or air and contains no water, the rod of the probe comprises one capacitor electrode while the fuel tank comprises the other. The polyethylene coating, diesel fuel and the air comprises the dielectric between the capacitor electrodes. With the configuration described the probe capacitance is on the order of 5 pf. When fuel tank condensation causes an accumulation of water in the fuel tank to a level extending at least part way up the probe 32, the water which is conductive and is grounded forms the second electrode of the capacitor and the polyethylene coating is the dielectric so that the probe then has a capacitance which depends upon the water level. When the water level is sufficient to cover the full length of the probe 32, the capacitance is of the order of 150 pf and is proportionately less for lower water levels.

Figure 3:
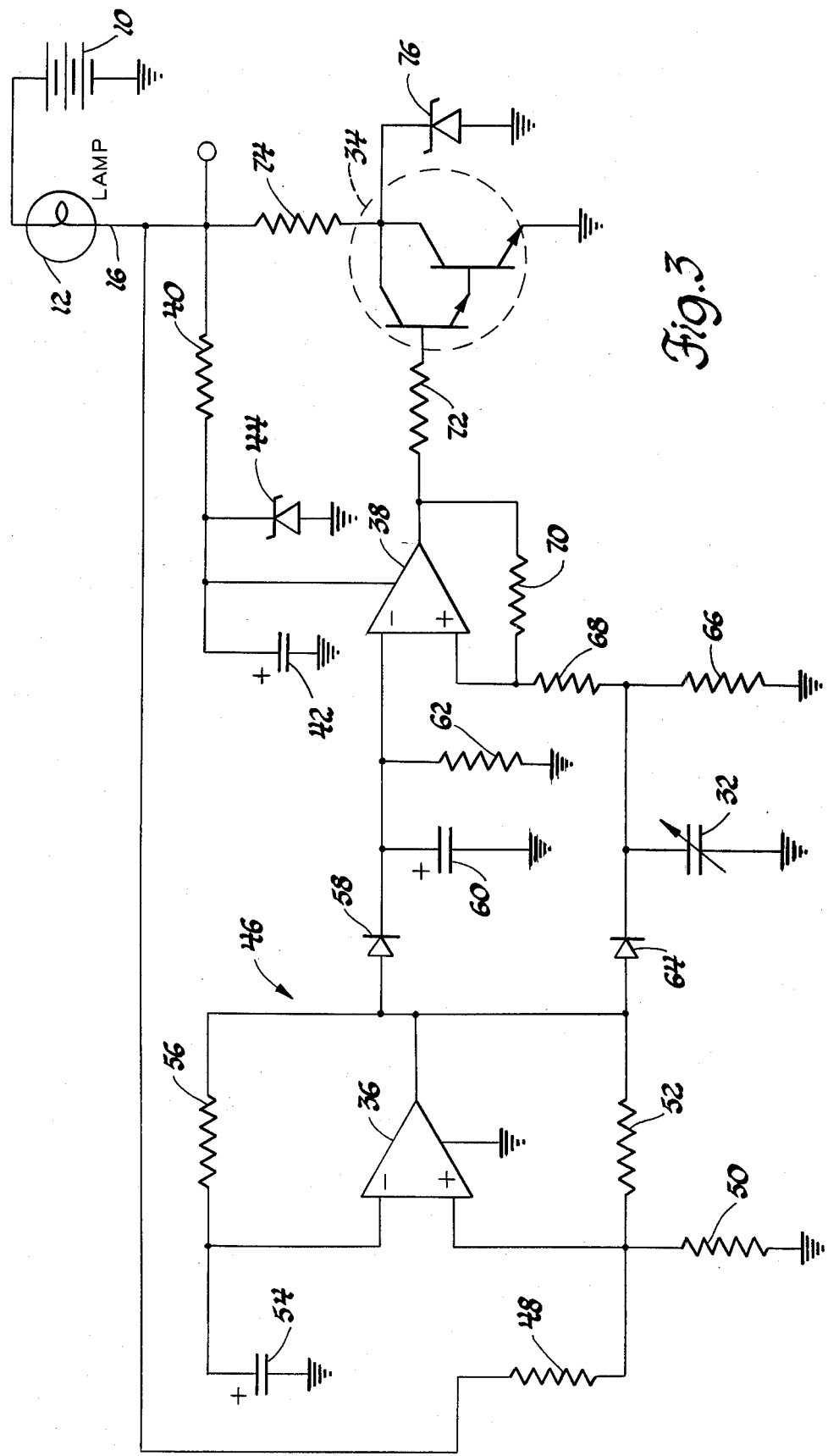
FIG. 3 is a schematic circuit of the threshold detector according to the invention.

The detection circuit of FIG. 3 detects a predetermined value of probe capacitance thereby providing a measure of a predetermined water level and energizing the indicator lamp 12 when that water level occurs. The solid state circuit elements in the detection circuit comprise a Darlington lamp driver 34 and a dual operational amplifier having sections 36 and 38. The operational amplifier is chosen to operate at a very low voltage, say 3 volts. The operational amplifier MLM258P manufactured by Motorola, Inc. of Schaumburg, Illinois is an example of such a device. The operating voltage is applied to the amplifier from the power supply 10 through the lamp 12 and conductor 16 and a resistor 40 to the amplifier. A capacitor 42 between the resistor 40 and ground provides filtering of RF transients and a zener diode 44 connected between the resistor 40 and ground in combination with resistor 40 clamps positive voltage transients to 20 volts to protect the operational amplifier. An oscillator 46 employs the operational amplifier 36. The positive input terminal of the amplifier is connected through a resistor 48 to line 16, resistor 50 to ground and resistor 52 to the output of the amplifier 36. The negative input terminal of the amplifier is connected through a capacitor 54 to ground and through a resistor 56 to the amplifier output. This circuit produces oscillations having the substantially straight sided waveforms depicted in FIG. 4. The small step approximately midway up each side of the waveform is an inherent characteristic of the operational amplifier 36.

The oscillator 46 output is applied through a diode 58 to a reference capacitor 60 and a resistor 62 connected in parallel to ground. The diode is further connected to the negative input of the operational amplifier 38. The oscillator output is also connected through a diode 64 which, in turn, is connected to the capacitive probe 32 and a resistor 66 which are connected in parallel to ground. Diode 64 is also connected through a resistor 68 to the positive input of the operational amplifier 38. That positive input is connected through a feedback resistor 70 to the amplifier output terminal. Thus, the operational amplifier 38 functions as a comparator for comparing the voltage on the probe 32 with that on the reference capacitor 60. The comparator output is connected through a resistor 72 to the input of the Darlington transistor pair 34. The Darlington transistor has its output connected between ground and a small resistor 74 which, in turn, is connected to the line 16. Zener diode 76 is connected between ground and the resistor 74 to clamp positive transients to 30 volts and protect the Darlington transistor.

Figure 4:
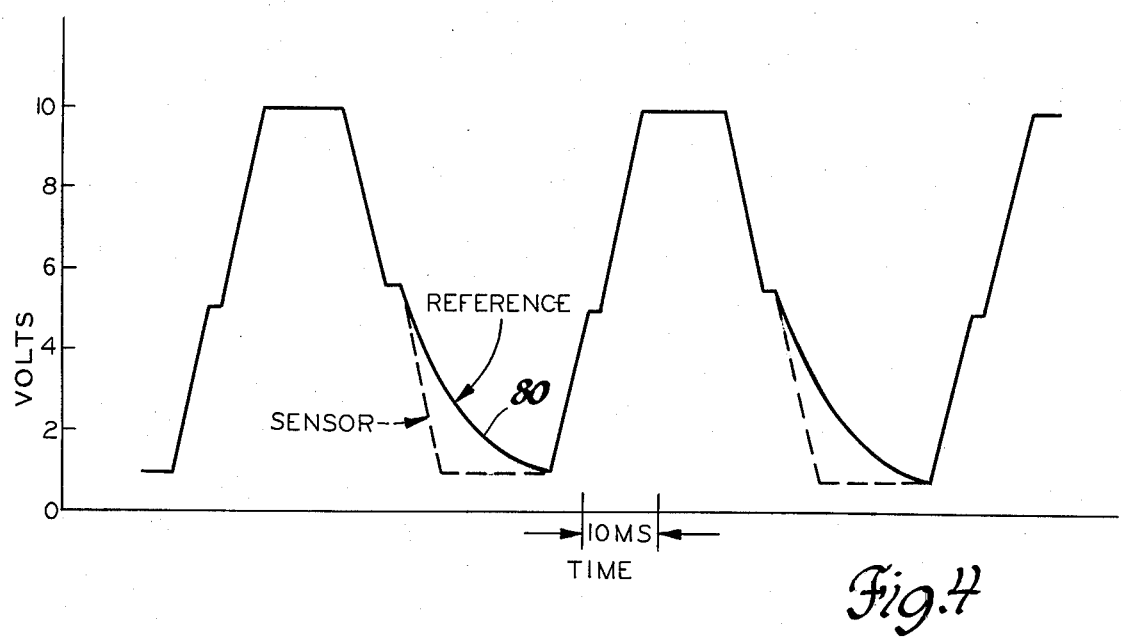
FIGS. 4 and 5 are waveforms representing the voltage across a reference capacitor and a sensing probe in the absence of water and in the presence of water, respectively.
Figure 5:
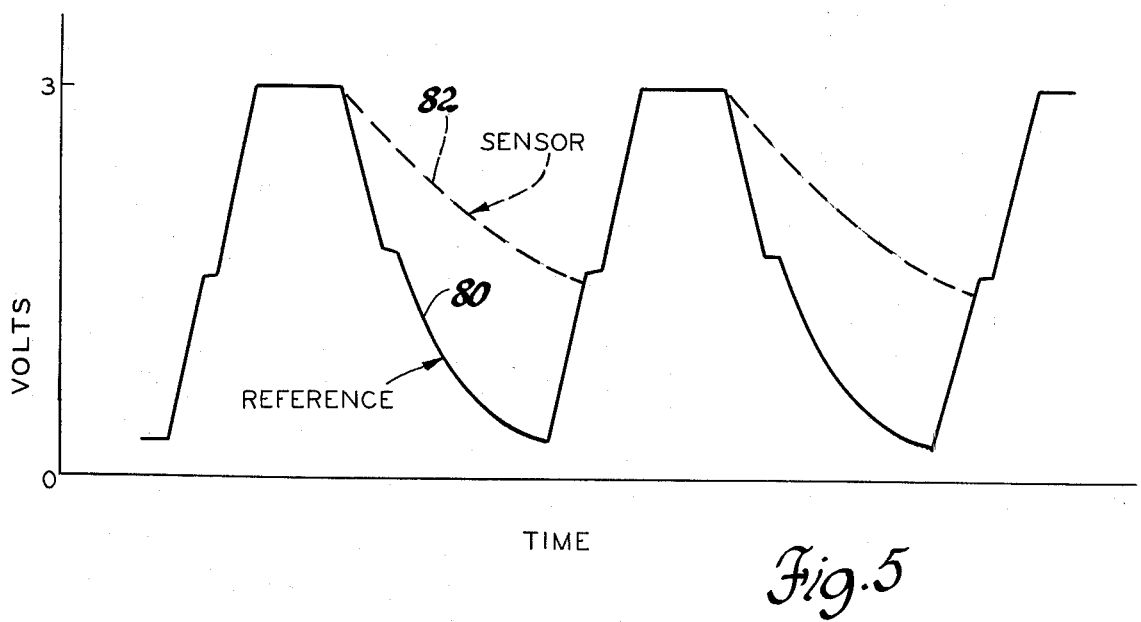

FIGS. 4 and 5, which chart the voltages across the reference capacitor and the probe when the probe is in fuel and water respectively, illustrate the operation of the circuit of FIG. 3. The oscillator 46 produces a series of pulses, each having nearly straight sides and flat peaks and valleys as shown by the sensor or probe voltage of FIG. 4. The amplitude of the oscillator output when the probe is in fuel and the lamp 12 is off closely follows the power supply voltage which may range from 6 to 18 volts. When the probe is in water and the lamp 12 is on, the voltage ranges from 3 to 5 volts. Thus, the waveforms in FIGS. 4 and 5 may vary greatly in amplitude. Considering FIG. 4; as the oscillator voltage increases, the reference capacitor and sensor capacitor or probe are charged through the respective diodes and increase in voltage together to reach essentially the same voltage peak. Then when the oscillator voltage drops along the negative slope of the waveform, the capacitors each discharge at a rate determined by its capacitance and the resistance in parallel therewith. Since the probe when it is in diesel fuel has a very low capacitance, about 5 pf, it discharges at a rate tracking the oscillator output. The reference capacitor 60, on the other hand, has a higher value, say about 75 pf, so that this voltage decays along a line 80. Thus, at the comparator input the voltage from the reference capacitor is equal to or higher than the voltage from the sensor capacitor so that the comparator will be off and the lamp driver 34 and lamp 12 will likewise be off. In this condition the feedback resistor 70 provides a slight bias due to current flow from the probe 32 and through the resistor 68 and 70 to the essentially grounded output of the operational amplifier 38. There is a small voltage drop across the resistor 68 so that the voltage at the positive input of the operational amplifier 38 is slightly lower than at the negative input to insure that the comparator remains off even though there may be some small differences in the characteristics of the diodes 58 and 64 or other circuit imbalance.

As shown in FIG. 5 for the case where the probe or sensor capacitor is in water, the probe and reference capacitor still charge at the rate determined by the oscillator voltage. However, the discharge rate of the sensor capacitor is now much slower than the reference capacitor as shown by the curve 82 for the sensor. This occurs since the probe when in water has a significantly higher capacitance, say about 150 pf, which is double that of the reference capacitor. Thus, the positive terminal of the comparator is at a higher voltage than the negative terminal so that the comparator turns on and the lamp driver 34 and the lamp 12 also turn on. Of course, the probe capacitance will be sufficient to turn on the comparator when it exceeds the value of the reference capacitor by a small amount. The high comparator output voltages fed back through the resistor 70 to the positive input provide hysteresis thereby insuring that the comparator stays on throughout the entire oscillator cycle. Thus, the indicator lamp 12 will remain on until a change in the water level causes the capacitance of the probe 32 to change to a value slightly below that of the reference capacitor 60. That is, the waveform 82 must drop slightly below waveform 80 to allow the comparator to turn off.

The voltage on line 16 which is available to operate the detection circuit depends on the voltage of the power supply 10, the voltage across the Darlington transistor, and the voltage dividing action of the lamp 12 and the resistor 74. When a two candle power lamp 12 is used, a 15 ohm resistor 74 is chosen. It has been found that with the power supply voltage at 18 volts, 260 ma current flows in the lamp. The lamp resistance is 51 ohms, and the voltage drop across the lamp is 13.2 volts so that the voltage applied to line 16 is 4.8 volts. For a power supply potential of six volts, 107 ma lamp current flows, the resistance is 28 ohms, the voltage drop across the lamp is then only three volts and voltage applied to line 16 is three volts which is sufficient to power the operational amplifier. Thus, even though the power supply voltage drops drastically, the compensating change in lamp resistance prevents a proportional drop in the voltage on line 16 which is therefore partially regulated.

It will thus be seen that the threshold detector according to this invention allows a condition sensing circuit remotely located from an indicating lamp and power supply to be connected thereto by a single conductor in addition to a ground return circuit for lamp control and to provide an operating voltage to the detection circuit which is partially voltage regulated to compensate for wide variations in power supply voltage.

The embodiments of the invention in which an exclusive property or privilege is claimed are defined as follows:

1. A threshold detector for providing an indication of a predetermined condition in an automotive vehicle having an electrical power supply grounded to the vehicle and subject to voltage changes throughout a large range, the detector comprising;

an incandescent indicating lamp having a first terminal connected to the power supply and located in view of a vehicle operator, the lamp having the property of decreased resistance when the voltage applied thereacross is decreased, an electronic detection circuit grounded to the vehicle and containing components operable at voltages substantially below the low end of the power supply voltage range and located remotely from the indicating lamp for sensing the said condition and producing a lamp energizing signal when the predetermined condition is detected, a single conductor connected between a second terminal of the lamp and the detection circuit to connect the detection circuit in series with the lamp for supplying operating voltage to the detection circuit and for carrying the lamp energizing signal to the lamp, thereby serially connecting the power supply and the lamp to the detection circuit by a single conductor, whereby when the lamp is energized, any decrease of power supply voltage is partially offset by an accompanying lamp resistance decrease to partially regulate the operating voltage supplied to the detection circuit to maintain the operating voltage at an adequate level when the power supply voltage is at a low level.

2. A threshold detector for providing an indication of a predetermined condition in an automotive vehicle having an electrical power supply grounded to the vehicle and subject to voltage changes throughout a large range, the detector comprising;

an incandescent indicating lamp having a first terminal connected to the power supply and located in view of a vehicle operator, the lamp having the property of decreased resistance when the voltage applied thereacross is decreased, an electronic detection circuit remote from the indicating lamp and grounded to the vehicle and containing amplifier means operable at voltages substantially below the power supply voltage range including a reference circuit, a condition variable probe circuit, a comparator including said amplifier means for comparing the outputs of the reference and probe circuits to detect a predetermined condition value and having feedback means for providing comparator hysteresis and for decreasing the probe circuit peak voltage at the comparator below the reference circuit peak voltage when the lamp is off to insure against premature comparator switching, and means responsive to the comparator output for producing a lamp energizing current when the predetermined condition value is detected, and a single conductor connected between a second terminal of the lamp and the detection circuit to connect the detection circuit in series with the lamp for supplying operating voltage to the detection circuit and for carrying the lamp energizing current to the lamp, whereby when the lamp is energized, any decrease of power supply voltage is partially offset by an accompanying lamp resistance decrease to partially regulate the operating voltage supplied to the detection circuit to maintain the operating voltage at an adequate level when the power supply voltage is at a low level.

* * * * *